US011466991B2

(12) United States Patent
Körner et al.

(10) Patent No.: US 11,466,991 B2
(45) Date of Patent: Oct. 11, 2022

(54) SENSOR DATA SYSTEM FOR A VEHICLE

(71) Applicant: Continental Automotive GmbH, Hannover (DE)

(72) Inventors: Rene Alexander Körner, Munich (DE); Susanne Eyrisch, Munich (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 58 days.

(21) Appl. No.: 16/701,858

(22) Filed: Dec. 3, 2019

(65) Prior Publication Data
US 2020/0191578 A1    Jun. 18, 2020

(30) Foreign Application Priority Data
Dec. 17, 2018 (DE) .................... 10 2018 221 945.1

(51) Int. Cl.
*G01C 21/32* (2006.01)
(52) U.S. Cl.
CPC .................................. *G01C 21/32* (2013.01)
(58) Field of Classification Search
CPC ..................................................... G01C 21/32
USPC .............................................................. 702/5
See application file for complete search history.

(56) References Cited

U.S. PATENT DOCUMENTS

| 10,152,058 B2 | 12/2018 | Bennie et al. | |
| 2010/0198513 A1* | 8/2010 | Zeng .................... | G01S 17/931 701/300 |
| 2013/0282277 A1* | 10/2013 | Rubin .................... | G08G 1/142 701/517 |
| 2018/0053060 A1* | 2/2018 | Huang .................... | G01S 19/48 |
| 2018/0113472 A1* | 4/2018 | Sakr ...................... | G05D 1/0276 |

(Continued)

FOREIGN PATENT DOCUMENTS

| DE | 10 2015 225 577 A1 | 6/2017 | ............ B60W 40/02 |
| DE | 10 2016 214 030 A1 | 2/2018 | ............ B60W 40/02 |
| DE | 10 2017 124 690 A1 | 5/2018 | ............ B60W 40/02 |

OTHER PUBLICATIONS

Papathanassiou, Apostolos et al., "Cellular V2X as the Essential Enabler of Superior Global Connected Transportation Services," Next Generation and Standards, Intel Client and Internet of Things Businesses and Systems Architecture Group (CISA), Intel Corporation, IEEE 5G Tech Focus: vol. 1, No. 2, Jun. 2017, 5 pages.

(Continued)

*Primary Examiner* — Ricky Go
(74) *Attorney, Agent, or Firm* — Slayden Grubert Beard PLLC

(57) ABSTRACT

Various embodiments include a sensor data system for a vehicle, the system comprising: a sensor in the vehicle, the sensor configured to collect environment data; a communication device configured to receive second environment model data from another vehicle; and a processing unit. The processing unit is configured to: calculate a first localization position of at least one of the vehicle or an object in the environment of the vehicle; generate first environment model data based at least in part on the environment data collected, wherein the first environmental model data and the second environment model data both contain localization data; compare the first localization data with the second localization data; and from the comparison determine a correction to the first localization position.

10 Claims, 3 Drawing Sheets

(56) References Cited

U.S. PATENT DOCUMENTS

2018/0136665 A1* 5/2018 Mudalige ............. G05D 1/0077
2018/0224283 A1* 8/2018 Fasola .................. G05D 1/0274
2019/0294898 A1* 9/2019 Jin ........................ B60W 40/02

OTHER PUBLICATIONS

German Office Action, Application No. 10 2018 221 945.1, 6 pages.

* cited by examiner

SENSOR DATA SYSTEM FOR A VEHICLE

CROSS-REFERENCE TO RELATED APPLICATIONS

This application claims priority to DE Application No. 10 2018 221 945.1 filed Dec. 17, 2018, the contents of which are hereby incorporated by reference in their entirety.

TECHNICAL FIELD

The present disclosure relates to vehicle systems. Various embodiments may include sensor data systems for vehicles, vehicles, and/or methods.

BACKGROUND

Among other things, driver assistance systems create environment models for automated driving. These include information about road users, the static environment, information on traffic control, reliable lane data, and the exact current position of the vehicle. Using this information, the vehicle respond can adequately respond in any traffic situation. The input data for generating the environmental system are provided mainly by sensors, such as lidar and radar sensors or video cameras.

An essential aspect of the environment models are the positions of the captured objects as well as the position of the vehicle itself. The positions of the detected objects are subject firstly to statistical noise and secondly are generally more inaccurate, the farther away they are from the sensor. The more accurately the position of the objects can be detected, the more accurately a vehicle can derive his own position.

SUMMARY

The teachings of the present disclosure may be used to improve an environment model of the vehicle. For example, some embodiments include a sensor data system (100) for a vehicle (201), having: a sensor device (130) in the vehicle (201), configured to collect environment data for first environment model data; a communication device (120), configured to receive second environment model data from another vehicle; the first and the second environment model data containing localization data; a processing unit (110), which is configured to calculate a first localization position of the vehicle (201) or an object in the environment of the vehicle (201), to generate the first environment model data from the environment data; to compare the first localization data with the second localization data; and from the comparison to determine a correction to the first localization position.

In some embodiments, the communication device (120) is configured additionally to receive third environment model data from an environment object, and the processing unit (110) is configured to add the third environment model data to the second environment model data.

In some embodiments, the processing unit (110) is configured to augment the first environment model data with the second environment model data.

In some embodiments, the processing unit (110) is configured to evaluate the first localization position with a reliability and accuracy; from the evaluation to generate a reliability information item and an accuracy information item; and to link the accuracy information and reliability information items to the first localization position.

In some embodiments, the second localization data also include a second localization position of the vehicle (201) as well as accuracy information and reliability information of the second localization position, and the processing unit (110) is configured to calculate the correction to the first localization position of the vehicle as a function of the accuracy information and reliability information of the first localization position and the second localization position on the basis of the first localization position or on the basis of the second localization position or on the basis of the first and the second localization position, weighted with the accuracy information and the reliability information.

In some embodiments, the first and the second environment model data each have a reliability information item and an accuracy information item, and processing unit (110) is additionally configured to calculate a correction to the first environment model data as a function of the accuracy information and reliability information from the first environment model data and the second environment model data.

In some embodiments, the vehicle (201) also has a transmitter unit (122, 123), and wherein the processing unit (110) is configured to calculate, on the basis of the second environment model data, a third localization position which is a localization position of the additional vehicle (202); to calculate an accuracy information and a reliability information of the third localization position; and to send the position correction, the accuracy information of the position correction and the reliability information of the position correction to the additional vehicle (202).

As another example, some embodiments include a vehicle having a sensor data system (100) as described above.

As another example, some embodiments include a method for correcting a localization position, having the steps: collecting (301) environment data and generating first environment model data from a vehicle; receiving (302) second environment model data from another vehicle, wherein the first and second environment model data include localization data; calculating (303) a first localization position of the vehicle or an object in the environment of the vehicle; comparing (304) the first localization data with the second localization data; and determining (305) a correction to the first localization position.

As another example, some embodiments include a program which, when it is executed on a processor of a sensor data system, instructs the driver assistance system to carry out the steps of the method as described above.

As another example, some embodiments include a computer-readable medium on which a program element as described above is stored.

BRIEF DESCRIPTION OF THE DRAWINGS

The teachings herein are further explained in the following on the basis of exemplary embodiments and by means of the figures, in which.

DETAILED DESCRIPTION

Figure 1:
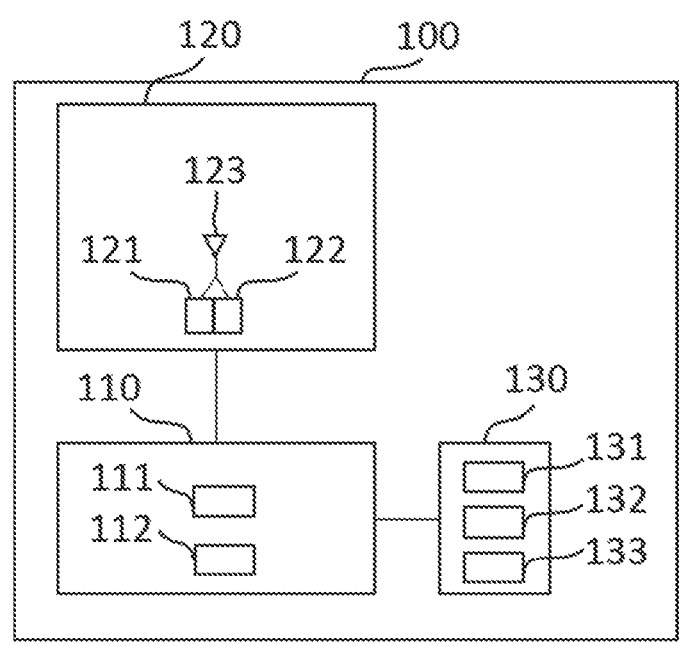
FIG. 1 shows a block diagram of a sensor data system incorporating teachings of the present disclosure.

In some embodiments, there is a sensor data system for a vehicle, which has a sensor device in a vehicle which is configured for collecting of environment data for first environment model data. The sensor data system also has a communication device which is configured to receive second environment model data from another vehicle. The first and the second environment model data contain localization data. Furthermore, the sensor data system has a processing unit which is configured to calculate a first localization position of the vehicle or of an object in the environment of the vehicle, to generate the first environment model data from the environment data, to compare the first localization data with the second localization data and to compare the first localization data with the second localization data, and from the comparison to determine a correction to the first localization position.

The processing unit is therefore configured firstly to calculate a position. This may be, for example, a localization position of the vehicle based on sensors for navigation or based on already existing data, such as environment model data. In addition, the processing unit obtains data for generating environment model data of an object in the environment of the vehicle from two sources: firstly, from its own sensors and secondly, from another vehicle or a plurality of other vehicles. Objects can be, for example, vehicles, traffic lights, beacons, etc.

10In particular, the additional vehicle which sends the second environment model data can also be one of these objects itself. While the second environment model data are sent by the other vehicle, the processing unit receives sensor data from its own vehicle, from which it must first generate the first environment model data. This may be, for example, the creation of a data structure for a detected object and the processing of the sensor data so that the resulting values can be stored in the data structure. The environment model data contain localization data, so that the processing unit can compare the first object-related localization data with the second localization data. It can therefore assign data that describe the same object, for example, to one another and also compare the values with each other, as described in more detail below. From the comparison the processing unit can finally calculate a correction to the first localization position.

Each of the objects detected by the vehicle's own sensors therefore also has a position. The position data are calculated from, for example, the vehicle's own sensor data. The positions are usually initially relative positions which are valid in a local coordinate system, such as the vehicle coordinate system. A reference to a global coordinate system can be produced using navigation satellite sensors, a compass or other sensors, for example.

The second environment model data can also contain relative and/or absolute position data. In particular, parked vehicles can provide a good reference position, since from the point of view of the receiving vehicle no extra-vehicle dynamics or latency times need to be taken into account or included in the calculations. Parked vehicles can also be located at positions that are known very precisely, such as surveyed parking spaces at charging stations.

If environment model data overlap with respect to an object, a comparison of the data can be made. The comparison can include a fusion of the data or deleting a data record. For example, if the data of the object have been received from one or more other vehicles, an average value of the position can be formed or, for example, only the position can be used which is closest to the detecting vehicle; or else so-called outliers can be discarded. Furthermore, the distance to the detecting vehicle can also be used for a weighted averaging.

The recalculation of the object positions can then be used to calculate a correction to the vehicle's own position. The comparison and the correction can be carried out in the form of a filter, such as a Kalman filter which, in particular, also takes into account the dynamics of the vehicle and possibly the objects to which the environment model data relate.

Since the correction of the first localization position can have an impact on the position of the other objects, different algorithms known to the person skilled in the art can be considered here. For example, estimation algorithms such as the above-mentioned Kalman filter, algorithms for minimizing the squared error or iterative algorithms can be applied.

By means of the comparison and/or the fusion of the environment model data and the correction of the vehicle's own localization position, an environment model which initially only consists of the first environment model data, for example, can be extended and improved. In particular, the vehicle's own localization position can be estimated more accurately from these.

In some embodiments, the communication device is configured additionally to receive third environment model data from an environment object, and the processing unit is configured to add the third environment model data to the second environment model data from the other vehicle. Environment objects which send the third environment model data are, for example, permanently installed equipment such as traffic lights, charging stations or light poles. Not only, but in particular, these fixed installations can transmit accurate location data, for example by measurement, so that they can not only be used as a very good relative reference, but can also form a very good absolute reference in a global coordinate system. For example, illuminated signage systems or emergency infrastructure devices, such as emergency alarm devices in tunnels, can also send exact position data where no reception of navigation satellites is possible.

The third environment model data from, for example, the permanently installed objects can also contain environment model data from other, stationary objects. These other, stationary objects do not send environment model data themselves, for example, but as a result they can act as precisely measured reference objects, detectable by the sensors. If multiple reference points, for example three, are known accurately and are visible at the same time, the first localization position can also be precisely corrected and the environment model data can thus also be used as an accurate absolute reference.

In some embodiments, the processing unit is configured to augment the first environment model data with the second environment model data. This extends the view of the vehicle data to include the environment model data that are based not on the vehicle's own data collection. Since the third environment model data are added to the second environment model data, here the second environment model data also include the third environment model data.

In some embodiments, the processing unit is configured to evaluate the reliability and accuracy of the first localization position and from the evaluation to generate reliability information and accuracy information, and to associate the accuracy information and reliability information to the first localization position. This information can be incorporated firstly into decisions of the driver assistance system where, for example, the exact position is a factor. Secondly, the information may also be significant for the correction of the first localization position and may be a factor for other vehicles if it is sent from the vehicle itself to the other vehicles, as explained in more detail below.

In some embodiments, the second localization data also include a second localization position of the vehicle as well as accuracy information and reliability information of the second localization position, and the processing unit is configured to calculate the correction to the first localization position of the vehicle as a function of the accuracy information and reliability information of the first localization position and the second localization position on the basis of the first localization position, or on the basis of the second localization position or on the basis of the first and the second localization position weighted with the accuracy information and the reliability information. For example, the processing unit first calculates its own localization position based on the first and second environment model data.

The processing unit evaluates the accuracy and the reliability of the first localization position, or else the correction to the first localization position. The accuracy and the reliability can be, for example, a calculation result of an estimator. For example, if the second localization position is evaluated as being more accurate and reliable than the first localization position or the correction, then, for example, the correction can be discarded from the environment model data. If, on the other hand, the correction is evaluated as more accurate and reliable than the received, second localization position, then the second localization position can be discarded and the second localization position can be used as the current localization position. If second localization positions are received from multiple other vehicles, the most accurate and reliable one can be selected. In some embodiments, the second localization position from the one or more additional vehicles and the vehicle's own localization position can also be weighted in the calculation of the correction, the weights being based on the accuracy and reliability information.

In some embodiments, the first and the second environment model data each have reliability information and accuracy information items, and the processing unit is additionally configured to calculate a correction to the first environment model data as a function of the accuracy information and reliability information from the first environment model data and the second environment model. This means that the localization positions can include not only accuracy and reliability information, but also the environment model data relating to each object. Accordingly, each data record for an object can be taken into account in weighted form, from zero percent to one hundred percent, i.e. exclusively. The latter is particularly useful for the above-mentioned objects installed at fixed positions, or parked vehicles with a precisely known position.

In some embodiments, the vehicle also has a transmitter unit and the processing unit is configured to calculate, on the basis of the second environment model data, a third localization position which is a localization position of the other vehicle, to calculate accuracy information and reliability information items of the third localization position, and to send the position correction, the accuracy information of the position correction and the reliability information of the position correction to the other vehicle. This means that while the first localization position is a self-determined position of the vehicle and the second localization position is the position of the vehicle itself, which has been received by another vehicle, the third localization position is the position of the other vehicle determined by the vehicle. This position is sent to the other vehicle, e.g. as part of the environment model data that the vehicle sends to the other vehicle using the transmitter unit.

In some embodiments, there a vehicle which has a sensor data system as described above.

In some embodiments, a method for correcting a localization position includes: collecting environment data and generating first environment model data from a vehicle, wherein the first environment model data include first localization data; receiving second environment model data from another vehicle, wherein the second environment model data include second localization data; calculating a first localization position of the vehicle or an object in the environment of the vehicle; comparing the first localization data with the second localization data; and determining a correction to the first localization position based on the comparison of the first localization data with the second localization data.

In some embodiments, the first and the second localization data include accuracy and reliability information, and the step of comparing the first localization data with the second localization data comprises the consideration of the accuracy and reliability information items in the calculation of the correction to the first localization position. The consideration can be carried out, for example, via a weighting based on the accuracy and reliability information items.

In some embodiments, a program element, when executed on a processor of a sensor data system instructs the sensor data system to carry out the steps of the method described above.

In some embodiments, a computer-readable medium is provided, on which such a program element is stored.

FIG. 1 shows a sensor data system 100 for a vehicle which has a sensor device 130 in the vehicle, which is configured for collecting environment data and for generating first environment model data. The sensor device 130 comprises, for example, sensors 131, 132, 133, which can be video cameras, lidar or radar sensors, etc. Additional sensors can be intended for example for navigation or conventional position determination, such as satellite navigation receivers, gyrators, speedometers, etc. Using these sensors and existing environment model data, a first localization position can be calculated by means of the processing unit 110, for example.

The sensor data system 100 also has a communication device 120 with a receiver unit 121 and an antenna 123, which is configured for receiving second environment model data from another vehicle. The communication device 120 can additionally comprise a transmitter unit 122. The sensor data system 100 also comprises the above-mentioned processing unit 110 with a processor 111 and a memory 112. The memory can store, for example, the received environment model data or the results of the processing unit 110, which are provided to the driver assistance system and are needed for subsequent calculations.

Figure 2:
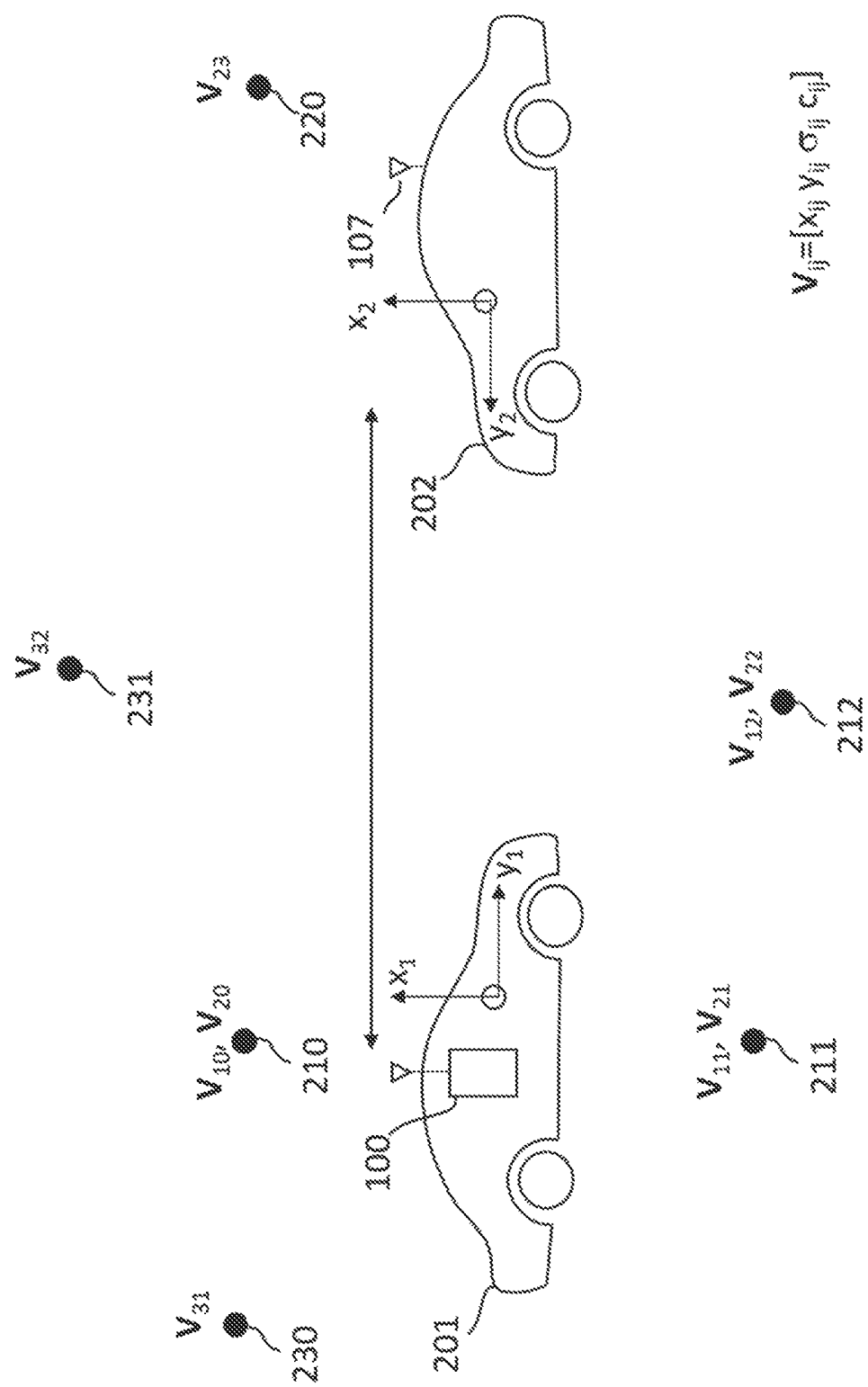
FIG. 2 shows a vehicle having a sensor data system and objects for an environment data model incorporating teachings of the present disclosure.

FIG. 2 shows a vehicle 201 having a sensor data system 100 and objects 210, 211, 212, 220, 231, 232 for an environment data model according to one exemplary embodiment. The objects 210, 211, 212 in this case are detected by vehicle 109 and the other vehicle 202. The objects 230 and 231 represent permanently installed systems whose environment model data are transmitted to the vehicle 201 from one of the two objects, for example. The object 220 is only detected by the other vehicle 202, which sends the environment model data of the object 220 to the vehicle 201. The data may be structured, for example, in vectors Vij, where i identifies the source, e.g. vehicle 201 (i=1), the other vehicle 202 (i=2), or a fixed installation (i=3) and j is an object number of the source. A vector comprises, for example, a position x, y, a precision and a reliability c. The vectors can also include other parameters, such as the coordinate system to which the position relates.

For example, the vehicle 201 can relate its collected environment model data to a local vehicle coordinate system x1, y1, while the fixed systems send their position in a global system. For the joint processing the coordinates are converted into a common coordinate system. The first environment model data V10, V11, V12 and the second environment model data V20, V21, V22, V23, V31, V32 therefore contain localization data. The processing unit 110 is configured to calculate a first localization position of the vehicle 201 or an object 210, 211, 212, 220, 231, 232 in the environment of the vehicle. In addition, it generates the first environment model data from the environment data so that both the environment model data based on the vehicle sensors and the environment model data 202 received from the additional vehicle are available to it. The processing unit 110 compares the first localization data with the second localization data in order to determine a correction to the first localization position from the comparison. This can be implemented, for example, in an estimator, as stated above.

Figure 3:
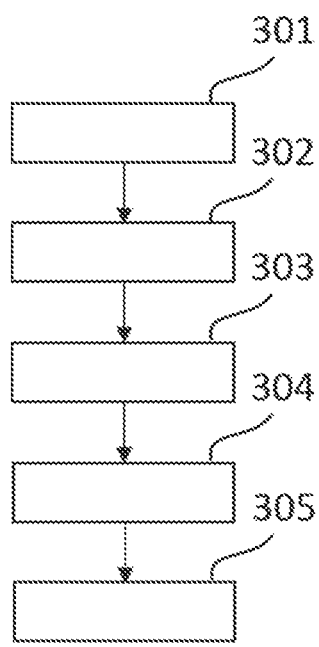
FIG. 3 shows a flow diagram of a method incorporating teachings of the present disclosure.

FIG. 3 shows a flow diagram of a method for correcting a localization position, having the steps: collecting (301) environment data and generating first environment model data from a vehicle; receiving (302) second environment model data from another vehicle, wherein the first and second environment model data include localization data; calculating (303) a first localization position of the vehicle or an object in the environment of the vehicle; comparing (304) the first localization data with the second localization data; and determining (305) a correction to the first localization position.

The invention claimed is:

1. A sensor data system for a vehicle, the system comprising:
   a sensor in the vehicle, the sensor configured to collect environment data related to a localization of the vehicle;
   a communication device configured to receive second environment data from a second vehicle related to a localization of the second vehicle; and
   a processing unit configured to:
      generate a first environmental model based on the environment data;
      generate a second environmental model based on the second environment data;
      calculate a first localization of at least one of the vehicle or an object in the environment of the vehicle using the first environment model;
      calculate a second localization of the at least one of the vehicle or the object using the second environment model;
      compare the first localization with the second localization; and
      from the comparison determine a correction to the first localization.

2. The sensor data system as claimed in claim 1, wherein:
   the communication device is configured to receive third environment data from an environment object; and
   the processing unit is configured to add the third environment data to the second environment data.

3. The sensor data system as claimed in claim 1, wherein the processing unit is configured to augment the first environment model with the second environment data.

4. The sensor data system as claimed in claim 1, wherein the processing unit is configured to:
   evaluate the first localization position with a reliability and accuracy;
   from the evaluation, generate a reliability information item and an accuracy information item; and
   link the accuracy information and reliability information items to the first localization position.

5. The sensor data system as claimed in claim 1, wherein:
   the second localization data also include a second localization position of the vehicle and accuracy information and reliability information of the second localization position; and
   the processing unit is configured to calculate the correction to the first localization position of the vehicle as a function of the accuracy information and reliability information of the first localization position and the second localization position on the basis of the first localization position or on the basis of the second localization position or on the basis of the first and the second localization position, weighted with the accuracy information and the reliability information.

6. The sensor data system as claimed in claim 1, wherein:
   the first environment model data and the second environment model data each include a reliability information item and an accuracy information item; and
   the processing unit is configured to calculate a correction to the first environment model data as a function of the accuracy information and reliability information from the first environment model data and the second environment model data.

7. The sensor data system as claimed in claim 1, wherein:
   the vehicle includes a transmitter unit; and
   the processing unit is configured to:
      calculate, on the basis of the second environment model data, a third localization position which is a localization position of the additional vehicle;
      calculate an accuracy information and a reliability information of the third localization position; and
      send the position correction, the accuracy information of the position correction and the reliability information of the position correction to the additional vehicle.

8. A vehicle comprising:
   a body;
   a drive system; and
   a sensor mounted in the body, the sensor configured to collect environment data related to a localization of the vehicle;
   a communication device configured to receive second environment data from a second vehicle related to a localization of the second vehicle; and
   a processing unit configured to:
      generate a first environmental model based on the environment data;
      generate a second environmental model based on the second environment data;
      calculate a first localization of at least one of the vehicle or an object in the environment of the vehicle using the first environment model;
      calculate a second localization of the at least one of the vehicle or the object using the second environmental model;
      compare the first localization with the second localization; and
      from the comparison determine a correction to the first localization.

9. A method for correcting a localization position, the method comprising:

collecting environment data and generating a first environment model related to a localization of the vehicle from a sensor in a vehicle;

receiving second environment data from a second vehicle related to a localization of the second vehicle;

generating a second environmental model based on the second environmental data;

calculating a first localization of the vehicle or an object in the environment of the vehicle using the first environment model;

calculating a second localization of the vehicle or the object using the second environmental model;

comparing the first localization with the second localization; and determining a correction to the first localization based on the comparison.

10. A non-transitory computer-readable medium storing a set of instructions, the set of instructions, when executed by a processor, causing the processor to:

collect environment data related to a localization of the vehicle and generate a first environment model from a sensor in a vehicle;

receive second environment data from a second vehicle related to a localization of the second vehicle;

generate a second environmental model based on the second environmental data;

calculate a first localization of the vehicle or an object in the environment of the vehicle using the first environment model;

calculate a second localization of the vehicle or the object using the second environmental model;

compare the first localization with the second localization; and determine a correction to the first localization based on the comparison.

* * * * *